Oct. 7, 1930.  L. M. GOLDSMITH  1,777,303
VALVE MECHANISM
Filed May 22, 1928      2 Sheets-Sheet 1

Inventor
Lester M. Goldsmith
Cornelius D. Ehret
By his Attorney

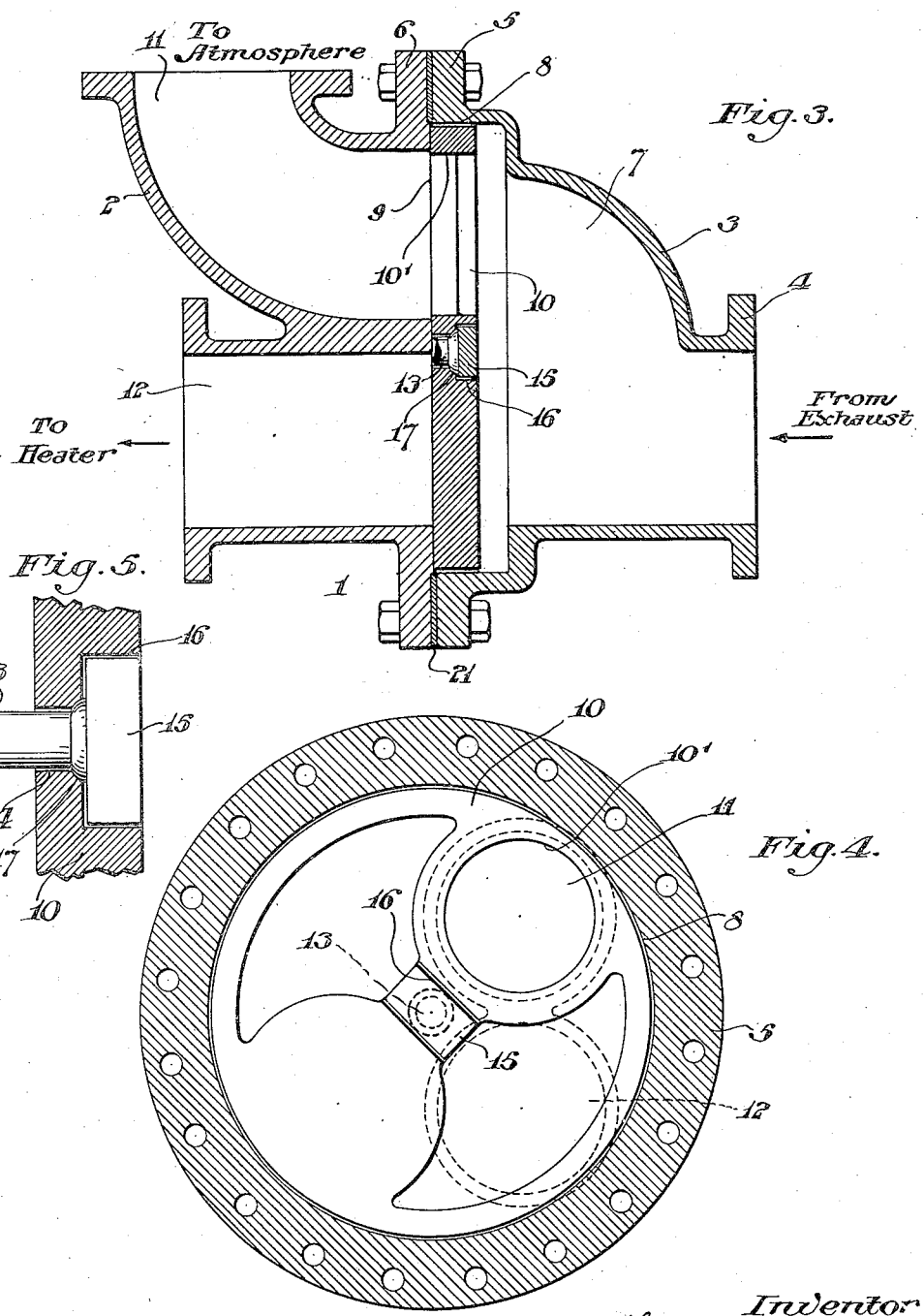

Patented Oct. 7, 1930

1,777,303

UNITED STATES PATENT OFFICE

LESTER M. GOLDSMITH, OF HIGHLAND PARK, PENNSYLVANIA

VALVE MECHANISM

Application filed May 22, 1928. Serial No. 279,632.

REISSUED

My invention relates to valves and more particularly to valves utilized to control the flow of hot gases, as from the exhaust of internal combustion engines, for example, of the Diesel type.

In accordance with my invention, there is provided valve structure to effect communication between a supply of fluid, as hot gases from the exhaust of a Diesel engine, and a selected outlet pipe or conduit, or to divide the total flow in any desired proportions between outlet pipes, without substantially obstructing or completely interrupting the flow of the exhaust gases for any position of the valve mechanism; more particularly, all or a portion of the gases may be utilized, as in a waste heat boiler, for the generation of steam and the remainder, if any, of the gases is passed to atmosphere.

Further in accordance with my invention, the valve structure comprises an apertured disc having one or more ports, disposed within the valve body and rotatable to direct the flow of gases as above stated; more especially, one face of the disc is subjected to the pressure of the gases and the other face thereof, preferably machined, is forced thereby into intimate contact with a co-acting surface of the valve body having outlet ports therein; more specifically and preferably, the disc is mounted upon and preferably supported solely by, an actuating rod or stem in a manner permitting movement of the disc relative thereto to maintain substantial area and intimacy of engagement between the aforesaid contacting surfaces of the disc and valve body despite warping, or other distortion resulting, for example, from the high temperature of the gases; still more specifically, the valve disc is, in effect, pivotally mounted on its actuating rod for restricted extent of movement in any direction.

My invention further resides in features of construction and arrangement of parts as hereinafter described and claimed.

For an understanding of my invention and for an illustration of a form it may take, reference is to be had to the accompanying drawings in which:

Fig. 3 is a side elevational view partly in section, taken on line 3—3 and line 3ª—3ª of Fig. 2.

Fig. 4 is a rear elevational view in section, taken on line 4—4 of Fig. 1.

Fig. 5 is a detail view of parts shown in Fig. 3.

Figure 1:
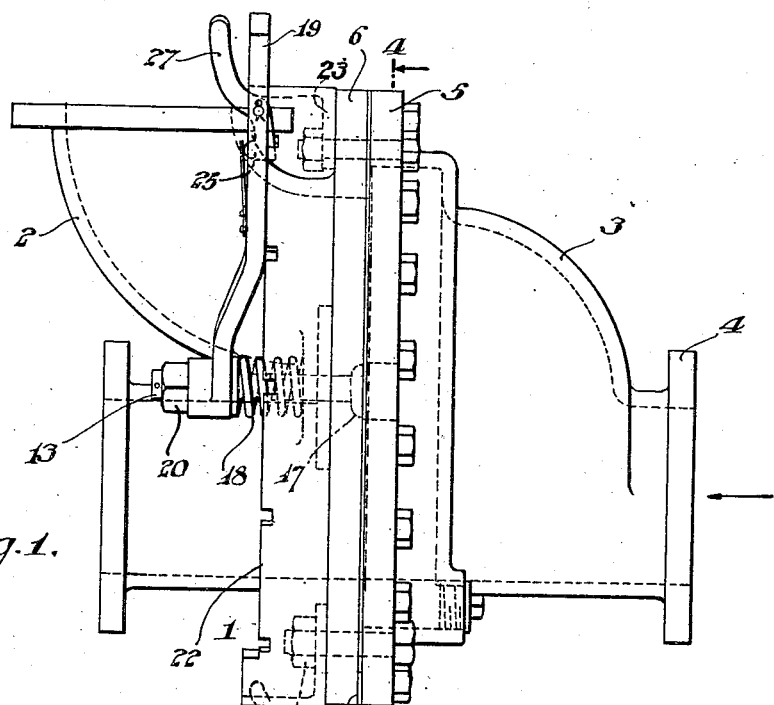
Fig. 1 is a side elevational view of the valve assembly.
Figure 2:
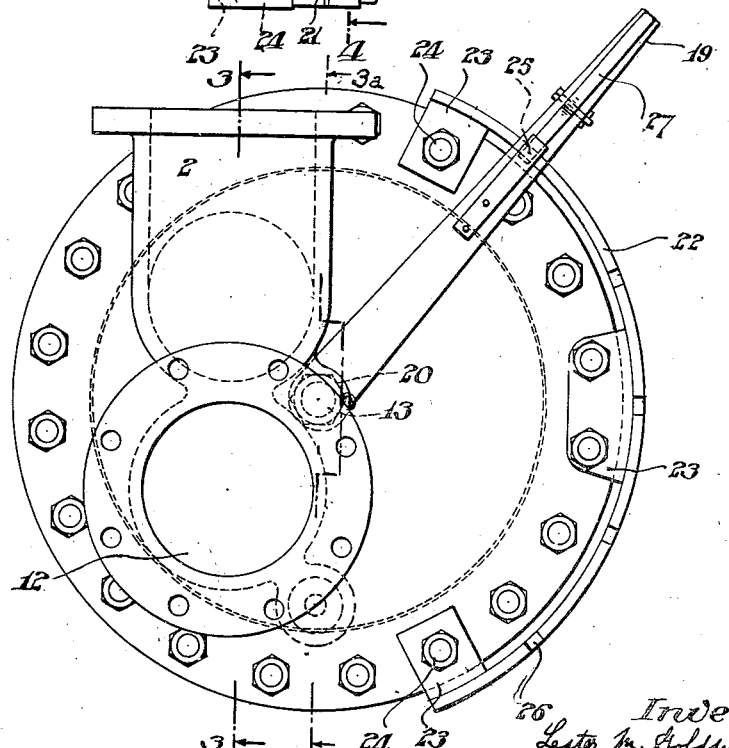
Fig. 2 is a front elevational view of the valve structure of Fig. 1.

Referring to the drawings, the valve body 1 is preferably comprised of two castings 2 and 3, respectively, of suitable material, as iron. The member 3 is provided with a flanged portion 4 adapted to be secured in any suitable manner to a fluid supply, for example, to a pipe or equivalent through which is passed the hot exhaust gases of an external combustion engine, as a Diesel engine or the like. At its opposite end the member 3 is provided with a larger flange 5 clamped in any suitable manner, as by bolts, to the flange 6 of the other valve body member 2. Intermediate the flanges 4 and 5, the member 3 is enlarged or bulged, to provide a chamber 7 to receive the exhaust gases, and a recess 8 for a valve member hereinafter described. The inner face of the member 2 is machined to form a smooth surface against which fits the back 9 of a valve disc 10. The back of the disc 9 and the co-acting face of the member 2 are preferably ground to ensure a tight-fitting joint.

The valve disc 10 is provided with an aperture or port 10' of suitable size, as for example, six inches or more depending upon the installation, and corresponding in size and shape to the outlet pipes or conduits 11 and 12 terminating in or comprising an integral part of the valve member 2. The inner openings of the conduits or outlet ports in the machined face of member 2 are so disposed that upon rotation of the valve disc 10 gases within the chamber 7 may flow through the aperture in the valve disc and through either conduit 11 or 12, or for intermediate positions of the valve disc 10 through both conduits, the proportionate amount of gas flowing through the respective conduits being determined by the position of the aperture 10'. The conduit 12, for example, may be connected to a pipe or conduit opening directly to atmosphere and the conduit 11 may be connected, for example, to a waste heat boiler, so that the heat of the exhaust gases may be utilized for the generation of steam.

A valve stem 13 passes through a suitable opening in casting 2 and extends through the hole 14 in the valve disc 10, the rectangular, or equivalent, key member 15 at the inner end thereof and preferably integral therewith fitting rather loosely in a recess 16 in the valve disc 10, corresponding substantially in size and shape to the key member. As shown most clearly in Fig. 5, the valve stem 13, intermediate the shank portion and key member 15 is flared outwardly and engages a seat 17 in the valve disc 10. The seat 17 and the co-operating flared portion of the valve stem are machined, as by a grinding operation to form a tight joint. Preferably there is a small clearance between the key member 15 of the valve stem and the bottom of the recess 16 of the valve disc 10.

A metal to metal connection between the disc 10 and its operating stem 13 formed by the flared portion and the recess or co-acting seat 17 forms a tight joint preventing leakage of the fluid despite warping of the metal at the high temperatures of exhaust gases, whereas a gasketed joint would fail after an interval of time, and a flat surface joint would leak due to the distortion. As the face of the valve disc 10 is subject to the gas pressure within the chamber 7, the rear machined face of the disc is pressed firmly against the smooth face of the casting 2, which prevents leakage around the disc.

In assembling the valve, the disc 10 is placed against the machined face of the casting 2 and the valve stem 13 is passed through the opening 14 of the valve disc and thence through the opening in the member 2. A spring 18 is disposed over the portion of the stem 13 protruding from the valve body and the handle 19 is thereafter attached or secured to the valve stem, as for example, by a nut 20. The spring 18 is compressed between the valve member 2 and the handle 19 to hold the flared portion of the valve stem 13 snugly against the recess 17 in the valve disc 10. A gasket 21, of suitable material, is placed between the flanges 5 and 6 of the valve castings 2 and 3. Preferably, as shown, the member 2 is slightly recessed to provide a guiding flange for the gasket.

In the valves as assembled, the periphery of the mounted disc 10 is spaced slightly from the adjacent inner wall of the body member 3. In the event of warping or other distortion of the disc 10 or of other parts of the valve structure, the disc 10 is free to pivot about the flared portion of the valve rod or stem 13 to maintain substantial area of and intimate contact between its machined surface and that of member 2. The clearances between the periphery of the disc and the walls of the inlet chamber, and between the valve disc 10 and key member 15 and the shank portion of valve stem 13 permit such restricted pivotal movement without binding of the disc or the actuating rod. For all positions of the valve, the area and pressure of engagement between the flared portion 17, preferably a segment of a sphere, and its seat in disc 10 remains substantially unchanged and effective to prevent leakage.

To more clearly show the relation between valve disc 10, the inlet chamber 7 and the outlet ports of member 2, Fig. 3 is a composite sectional view, the section of valve body member 2 being taken on line 3—3 and that of member 3 and disc 10 being taken on broken line 3ª—3ª.

By moving the handle 19, the valve disc may be rotated to cause the aperture 10' to register with either of the outlet conduits 11 or 12, or partially with both, and at the same time block off the other annular opening or a portion of both of the openings. As stated above, the fluid or hot gases entering the valve chamber 7 may, by operating the handle 19, be directed to a selected outlet pipe or conduit to the exclusion of the other, or the total flow may be divided in any desired proportion between the outlet pipes. The movement of the handle, however, is limited to prevent the valve disc from being rotated to a position at which it will completely block the passage of gases from the chamber 7. This is particularly necessary when the valve is utilized as described to control the flow of exhaust gases of an internal combustion engine since, if no outlet is provided or, in other words, if the passage is blocked, the engine will choke and fail to function.

To indicate the position of valve disc 10 and to ensure complete and free communication with the desired outlet conduit, the notched quadrant 22 suitably secured to the casting 2 as by lugs and bolts 23 and 24, respectively, is provided. The end notches 25 and 26 in the quadrant bear such relation to conduits 11 and 12 and to the aperture 10' of the valve disc, that when the latch 27 pivoted to the actuating handle 19 is in notch 25, all of the gases flow through the conduit 12 and when in notch 26, all of the gases flow through conduit 11. Both conduits are partially opened and the gas flow divided between them when the latch 27 is engaged in intermediate notches of the quadrant.

While the valve as above described comprises but two conduits with which a valve disc having a single aperture co-operates, it will be understood that, in so far as certain aspects of my invention are concerned, a greater number of conduits may be provided and the number of apertures in the valve disc co-acting therewith may remain the same or be increased, as desired.

When a valve, for example, of the gate type, is utilized to control the flow of gases at elevated temperatures, particularly those of chemically active nature, the seat of the valve is in contact with and subjected to the corrosive action of the gases. Ultimately within a more or less short period of time, the seat is pitted or corroded to an extent rendering the valve, in its closed position, ineffective to prevent flow therethrough. In the construction above described, and particularly as employed in types of installation in which division of flow is not effected, the seating or finished surface of member 2 and the back, co-acting surface of valve disc 10 are not in contact with gases flowing through the valve and their effectiveness as a seal is unimpaired by the physical, and particularly the chemical properties thereof.

What I claim as my invention is:

1. Valve mechanism comprising a hollow member forming an inlet chamber, a second member having a finished surface comprising a valve seat with outlet ports therein, an apertured valve disc having a face in fluid sealing contact with said finished surface and rotatable within said hollow member, said valve seat protected by said disc against corrosive action by fluid traversing the valve mechanism, and means to effect movement of said disc to direct flow of fluid within said chamber through said disc to at least one of said outlet ports.

2. Valve mechanism comprising a hollow member forming an inlet chamber, a second member having an outlet port, a rotatable valve disc and actuating structure therefor, comprising a member passing freely through said disc having a flared portion co-acting with a seat in said disc and an abutting portion to transmit movement of said rod to said disc.

3. Valve mechanism comprising a hollow member, a valve disc and actuating structure therefor comprising a rod passing through said disc having a flared portion co-acting with a seat portion of said disc and a portion to transmit movement of said rod to said disc.

4. Valve mechanism comprising a hollow member, a valve disc rotatable therein, actuating structure therefor comprising a rod passing through said disc having a flared portion co-acting with a seat portion of said disc and a portion to transmit movement of said rod to said disc, an abutment on said rod exteriorly of said mechanism, and a spring co-operating therewith to maintain engagement between said flared portion and said seat.

5. Valve mechanism comprising a hollow member forming an inlet chamber, a second member having a finished surface with outlet ports therein, an apertured disc having a face in contact with said finished surface and rotatable within said chamber, a rod extending freely through said disc at the center thereof into said inlet chamber, and an abutment thereon engaging a recess in said disc to transmit motion thereto, said rod having a flared portion tightly engaging a seat in said disc to prevent leakage.

6. Valve mechanism comprising a chamber for receiving exhaust gases from an internal combustion engine, outlet ports in a wall of said chamber forming a valve seat, and a movable plate in continuous face to face engagement with substantially all of said valve seat to prevent contact therebetween and the corrosive, high-temperature exhaust gases within said chamber, and having an opening adapted to be brought into register with a selected one of said ports.

7. Valve mechanism comprising a chamber for receiving exhaust gases from an internal combustion engine, outlet ports in a wall of said chamber forming a valve seat, a movable plate in continuous face to face engagement with substantially all of said valve seat to prevent contact therebetween and the corrosive, high-temperature exhaust gases within said chamber, and having an opening adapted to be brought into register with a selected one of said ports, and means for limiting movement of said valve plate within a range ensuring a passage from said chamber through said opening of said plate.

8. Valve mechanism comprising an inlet chamber, outlet ports of substantially equal area in a wall of said chamber forming a valve seat, a valve disk within said chamber in continuous face to face contact with substantially all of said valve seat and having an opening corresponding substantially in area to said outlet ports, and means to effect movement of said disk to direct flow of fluid within said chamber through said disk opening to at least one of said ports.

LESTER M. GOLDSMITH.